(12) United States Patent
Deng et al.

(10) Patent No.: US 10,639,710 B2
(45) Date of Patent: May 5, 2020

(54) MELTING POT, AND FLOAT SALVAGING APPARATUS AND METHOD FOR MELTING POT

(71) Applicant: JIANGXI NERIN EQUIPMENT CO., LTD., Nanchang, Jiangxi (CN)

(72) Inventors: Aimin Deng, Jiangxi (CN); Hui Ding, Jiangxi (CN); Hongdao Peng, Jiangxi (CN); Jianfei Huang, Jiangxi (CN); Hao Chen, Jiangxi (CN); Jialiang Wang, Jiangxi (CN); Xiaoguang Shao, Jiangxi (CN); Wei Li, Jiangxi (CN); Xin Yu, Jiangxi (CN); Yanbing He, Jiangxi (CN); Dongdong Wei, Jiangxi (CN); Fangcheng Zeng, Jiangxi (CN); Wenbin Liu, Jiangxi (CN); Qian Lou, Jiangxi (CN); Wenyue Li, Jiangxi (CN); Jun Hu, Jiangxi (CN); Xuelin Wang, Jiangxi (CN); Zhaochang Deng, Jiangxi (CN); Wenzeng Zhang, Jiangxi (CN)

(73) Assignee: JIANGXI NERIN EQUIPMENT CO., LTD., Nanchang, Jiangxi (CN)

( * ) Notice: Subject to any disclaimer, the term of this patent is extended or adjusted under 35 U.S.C. 154(b) by 197 days.

(21) Appl. No.: 15/545,545

(22) PCT Filed: Feb. 1, 2016

(86) PCT No.: PCT/CN2016/073079
§ 371 (c)(1),
(2) Date: Jul. 21, 2017

(87) PCT Pub. No.: WO2016/124123
PCT Pub. Date: Aug. 11, 2016

(65) Prior Publication Data
US 2018/0009029 A1    Jan. 11, 2018

(30) Foreign Application Priority Data

Feb. 5, 2015  (CN) .......................... 2015 1 0060926
Feb. 5, 2015  (CN) .................... 2015 2 0083174 U

(51) Int. Cl.
*B22D 43/00*       (2006.01)
*C21C 5/46*        (2006.01)
(Continued)

(52) U.S. Cl.
CPC ........... *B22D 43/002* (2013.01); *B22D 43/00* (2013.01); *B22D 43/005* (2013.01); *C21B 7/14* (2013.01);
(Continued)

(58) Field of Classification Search
CPC .... B22D 43/00; B22D 43/002; B22D 43/005; C21B 7/14; C21C 5/4653; C21C 7/0087;
(Continued)

(56) References Cited

U.S. PATENT DOCUMENTS

| 3,894,728 A * | 7/1975 | Berkens | ..................... B66C 3/16 266/228 |
| 3,913,756 A * | 10/1975 | Barron | ..................... C21C 5/46 414/586 |
| 6,464,929 B1 * | 10/2002 | Groteke | ..................... C21C 5/36 266/205 |

FOREIGN PATENT DOCUMENTS

| CN | 102489697 A | 6/2012 |
| CN | 202648457 U | 1/2013 |

(Continued)

OTHER PUBLICATIONS

English translation of the International Search Report dated Mar. 14, 2016 for corresponding International Application No. PCT/CN2016/073079, filed Feb. 1, 2016.
(Continued)

*Primary Examiner* — Jessee R Roe
*Assistant Examiner* — Michael Aboagye

(74) *Attorney, Agent, or Firm* — David D. Brush; Westman, Champlin & Koehler, P.A.

(57) ABSTRACT

A melting pot includes a pot body and a float salvaging apparatus. The pot body is provided with a melting chamber having an open upper end. The float salvaging apparatus includes a hanging bracket, a bearing plate, a rotating plate and a drive assembly configured to drive pivoting of the rotating plate. The hanging bracket is disposed above the melting chamber. The rotating plate is pivotably disposed on the bearing plate, and the bearing plate and the rotating plate are provided on the hanging bracket between an initial position and a first salvaging position in a manner of moving up and down. The drive assembly is connected to the rotating plate.

20 Claims, 3 Drawing Sheets

(51) Int. Cl.
*C21C 7/00* (2006.01)
*C21B 7/14* (2006.01)
*F27D 25/00* (2010.01)
*F27D 3/15* (2006.01)
*F27D 5/00* (2006.01)

(52) U.S. Cl.
CPC .......... *C21C 5/4653* (2013.01); *C21C 7/0087* (2013.01); *F27D 3/1545* (2013.01); *F27D 25/00* (2013.01); *F27D 3/1563* (2013.01); *F27D 2005/0075* (2013.01)

(58) Field of Classification Search
CPC ............. F27D 2005/0075; F27D 25/00; F27D 3/1545; F27D 3/1563
USPC ................ 266/227, 228, 161, 165, 143, 276
See application file for complete search history.

(56) References Cited

FOREIGN PATENT DOCUMENTS

| | | |
|---|---|---|
| CN | 104697349 A | 6/2015 |
| CN | 204535441 U | 8/2015 |
| DE | 2539512 B1 | 4/1976 |
| JP | S6129684 A | 2/1986 |
| JP | 2006097078 A | 4/2006 |
| SU | 569832 A1 | 8/1977 |

OTHER PUBLICATIONS

Written Opinion of the International Searching Authority dated Mar. 14, 2016 for corresponding International Application No. PCT/CN2016/073079, filed Feb. 1, 2016.
Office Action dated Oct. 18, 2018 for AU Application No. 2016214885.
English translation of the Written Opinion of the International Searching Authority dated Apr. 20, 2016 for corresponding International Application No. PCT/CN2016/073079, filed Feb. 1, 2016.

* cited by examiner

MELTING POT, AND FLOAT SALVAGING APPARATUS AND METHOD FOR MELTING POT

CROSS-REFERENCE TO RELATED APPLICATION

The present application is a U.S. National Phase entry under 35 U.S.C. § 371 of International Application PCT/CN2016/073079, filed Feb. 1, 2016, and published as WO 2016/124123 on Aug. 11, 2016, not in English, which claims the benefit of and priority to Chinese Patent Application No. 201510060926.4, filed Feb. 5, 2015, and Chinese Patent Application No. 201520083174.9, filed Feb. 5, 2015, the entire disclosures of which are incorporated herein by reference.

FIELD

The present disclosure relates to a field of metallurgy, and specifically, the present disclosure relates to a melting pot, and a float salvaging apparatus for the melting pot and a salvaging method for the float salvaging apparatus.

BACKGROUND

In nonferrous metal fire metallurgy, a melting pot is usually adopted as a refinement and purification means for an intermediate product, an operation temperature in the melting pot reaches above 400□, a slagging agent is added when the metal is melted, a scum is produced continuously after stirring, and the scum needs to be salvaged and conveyed to a collecting area periodically.

SUMMARY

The present disclosure seeks to solve one of the technical problems existing in the related art at least in some extent. Accordingly, a melting pot is provided in the present disclosure, and a float in the melting pot can be salvaged rapidly, effectively and automatically.

A float salvaging apparatus which can salvage the float in the melting pot rapidly, effectively and automatically is also provided in the present disclosure.

A salvaging method performed by means of the float salvaging apparatus is further provided in the present disclosure.

The melting pot according to embodiments of a first aspect of the present disclosure includes a pot body provided with a melting chamber having an open upper end and a float salvaging apparatus. The float salvaging apparatus includes: a hanging bracket disposed above the melting chamber; a bearing plate; a rotating plate pivotably disposed on the bearing plate, and the bearing plate and the rotating plate being provided on the hanging bracket between an initial position and a first salvaging position and movable in the up-down direction; and a driving assembly configured to drive pivoting of the rotating plate, in which the driving assembly is connected with the rotating plate.

With the melting pot according to embodiments of the present disclosure provided with the float salvaging apparatus, the float in the pot body can be salvaged rapidly, effectively and automatically.

In addition, the melting pot according to embodiments of the present disclosure may further have the following additional technical features.

According to an embodiment of the present disclosure, the bearing plate and the rotating plate are located above a liquid level in the melting chamber at the initial position, and at least a part of the rotating plate is located below the liquid level in the melting chamber at the first salvaging position.

According to an embodiment of the present disclosure, the rotating plate is pivotably disposed on the bearing plate between an entering position and a second salvaging position, at the second salvaging position, an included angle between the rotating plate and a horizontal plane is larger than or equal to 10 degrees and smaller than 90 degrees, and at the entering position, the included angle between the rotating plate and the horizontal plane ranges from −60 degrees to −120 degrees.

According to an embodiment of the present disclosure, both the bearing plate and the rotating plate are flat plates, the bearing plate is disposed horizontally, and when the rotating plate is oriented along a horizontal direction, shape and size of a constituted flat plate formed by the bearing plate and the rotating plate match with shape and size of a cross section of the melting chamber respectively.

The float salvaging apparatus according to embodiments of a second aspect of the present disclosure includes: a hanging bracket; a bearing plate; a rotating plate pivotably disposed on the bearing plate, the bearing plate and the rotating plate being provided on the hanging bracket between an initial position and a first salvaging position and movable in the up-down direction; and a driving assembly configured to drive pivoting of the rotating plate, in which the driving assembly is connected with the rotating plate.

The float salvaging apparatus according to embodiments of the present disclosure has advantages of a high salvaging efficiency, a great salvaging effect and a high automatic degree.

In addition, the float salvaging apparatus according to embodiments of the present disclosure may further have the following additional technical features.

According to an embodiment of the present disclosure, the rotating plate is pivotably disposed on the bearing plate between an entering position and a second salvaging position, at the second salvaging position, an included angle between the rotating plate and a horizontal plane is larger than or equal to 10 degrees and smaller than 90 degrees, and at the entering position, the included angle between the rotating plate and the horizontal plane ranges from −60 degrees to −120 degrees.

According to an embodiment of the present disclosure, the hanging bracket includes: a hanging bracket body; and a guiding rod disposed onto the hanging bracket body, in which the guiding rod extends downwards from the hanging bracket body, and the bearing plate is provided on the guiding rod between the initial position and the first salvaging position and movable in the up-down direction. Preferably, the hanging bracket further includes a sleeve rod, the sleeve rod is sleeved over the guiding rod between the initial position and the first salvaging position and movable in the up-down direction, and the bearing plate is disposed to the sleeve rod.

According to an embodiment of the present disclosure, the bearing plate is pivotably disposed to the hanging bracket.

According to an embodiment of the present disclosure, the bearing plate includes a horizontal plate and a stop plate, the stop plate is disposed onto the horizontal plate and extends upwards from the horizontal plate, and an accommodating space is defined between the bearing plate and the rotating plate at the second salvaging position.

According to an embodiment of the present disclosure, a plurality of rotating plates are provided, and preferably, two rotating plates are provided and the two rotating plates are oppositely disposed.

According to an embodiment of the present disclosure, the driving assembly includes: a support disposed onto an upper surface of the bearing plate; a sliding block disposed to the bracket and movable in the up-down direction; a drive connected with the sliding block so as to drive the sliding block to move up and down; and a connecting rod assembly including a first connecting rod, a second connecting rod and a third connecting rod, in which an upper end of the first connecting rod is articulated with the sliding block, a lower end of the second connecting rod is articulated with the rotating plate, a first end of the third connecting rod is articulated with the support, and a lower end of the first connecting rod is articulated with an upper end of the second connecting rod and a second end of the third connecting rod is articulated with the upper end of the second connecting rod.

According to an embodiment of the present disclosure, the support includes a left sliding rod and a right sliding rod, the sliding block includes a left sliding block disposed onto the left sliding rod and movable in the up-down direction and a right sliding block disposed onto the right sliding rod and movable in the up-down direction, the driving assembly further includes a transverse rod connected with the drive, the transverse rod is connected with both the left sliding block and the right sliding block, two connecting rod assemblies are provided, an upper end of the first connecting rod of one of the two connecting rod assemblies is articulated with the left sliding block, a first end of the third connecting rod of the one of the two connecting rod assemblies is articulated with the left sliding rod, an upper end of the first connecting rod of the other one of the two connecting rod assemblies is articulated with the right sliding block, and a first end of the third connecting rod of the other one of the two connecting rod assemblies is articulated with the right sliding rod.

According to an embodiment of the present disclosure, the driving assembly further includes an upright rod, the drive is connected with the upright rod, and the upright rod is connected with the transverse rod.

According to an embodiment of the present disclosure, the bracket further includes a connection rod, the connection rod includes a rod body, a first sliding block and a second sliding block, the rod body is connected with the left sliding rod and the right sliding rod, both the first sliding block and the second sliding block are disposed onto the rod body and moveable in a left-right direction, and the driving assembly further includes: a fourth connecting rod and a fifth connecting rod, the fourth connecting rod and the fifth connecting rod being disposed crosswise and articulated together, an upper end of the fourth connecting rod being articulated with the first sliding block of the connection rod, an upper end of the fifth connecting rod being articulated with the second sliding block of the connection rod, in which the drive is connected with a hinge position of the fourth connecting rod and the fifth connecting rod; and a sixth connecting rod and a seventh connecting rod, an upper end of the sixth connecting rod being articulated with a lower end of the fifth connecting rod, an upper end of the seventh connecting rod being articulated with a lower end of the fourth connecting rod, in which both a lower end of the sixth connecting rod and a lower end of the seventh connecting rod are articulated with the upright rod.

According to an embodiment of the present disclosure, the lower end of the sixth connecting rod is articulated with the lower end of the seventh connecting rod.

According to an embodiment of the present disclosure, both the bearing plate and the rotating plate are flat plates and the bearing plate is disposed horizontally.

According to an embodiment of the present disclosure, at least one of the bearing plate and the rotating plate is disposed with a leakage hole.

The salvaging method according to embodiments of a third aspect of the present disclosure performed by means of the float salvaging apparatus according to the embodiments of the second aspect of the present disclosure includes the following steps: A) rotating the rotating plate to make the included angle between the rotating plate and the horizontal plane negative; B) moving the bearing plate and the rotating plate from the initial position to the first salvaging position; C) rotating the rotating plate to make the included angle between the rotating plate and the horizontal plane larger than or equal to 0 degree so as to make the float to be located in the accommodating space defined between the bearing plate and the rotating plate; and D) moving the bearing plate and the rotating plate from the first salvaging position to the initial position.

With the salvaging method according to embodiments of the present disclosure, the float in the pot body can be salvaged rapidly, effectively and automatically.

According to an embodiment of the present disclosure, two rotating plates are provided and the two rotating plates are oppositely disposed, an inner end portion of each of the rotating plates is pivotably disposed to the bearing plate, and in the step A), the two rotating plates are rotated to make outer end portions of the two rotating plates in contact with each other.

According to an embodiment of the present disclosure, in step C), the rotating plate is rotated to make the included angle between the rotating plate and the horizontal plane larger than or equal to 10 degrees and smaller than 90 degrees.

DETAILED DESCRIPTION

Embodiments of the present disclosure will be described in detail in the following. The embodiments described with reference to the drawings are illustrative, which is only used to explain the present disclosure and shouldn't be construed to limit the present disclosure.

Figure 1:
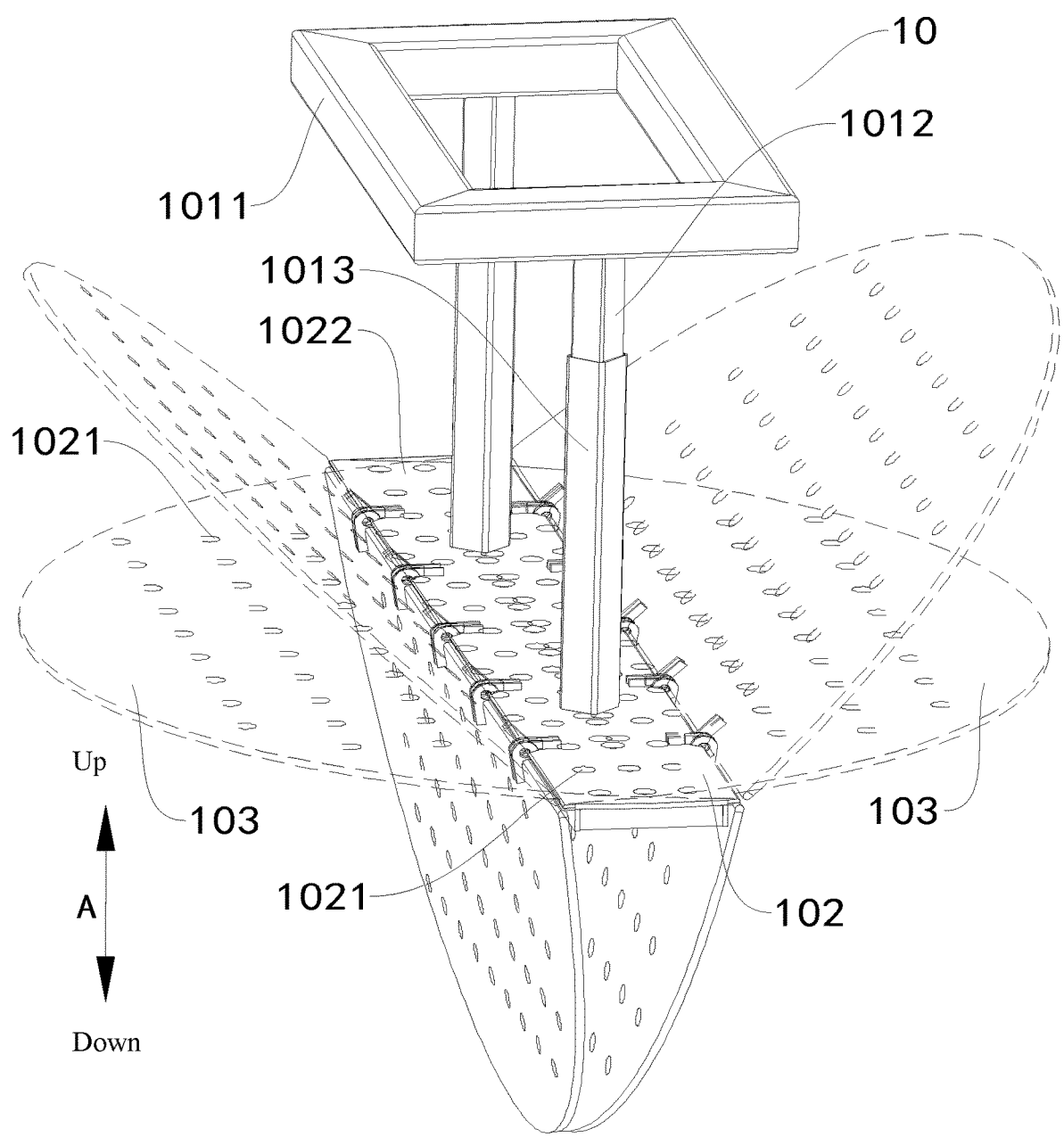
FIG. 1 is a partial schematic view of a float salvaging apparatus according to embodiments of the present disclosure.
Figure 2:
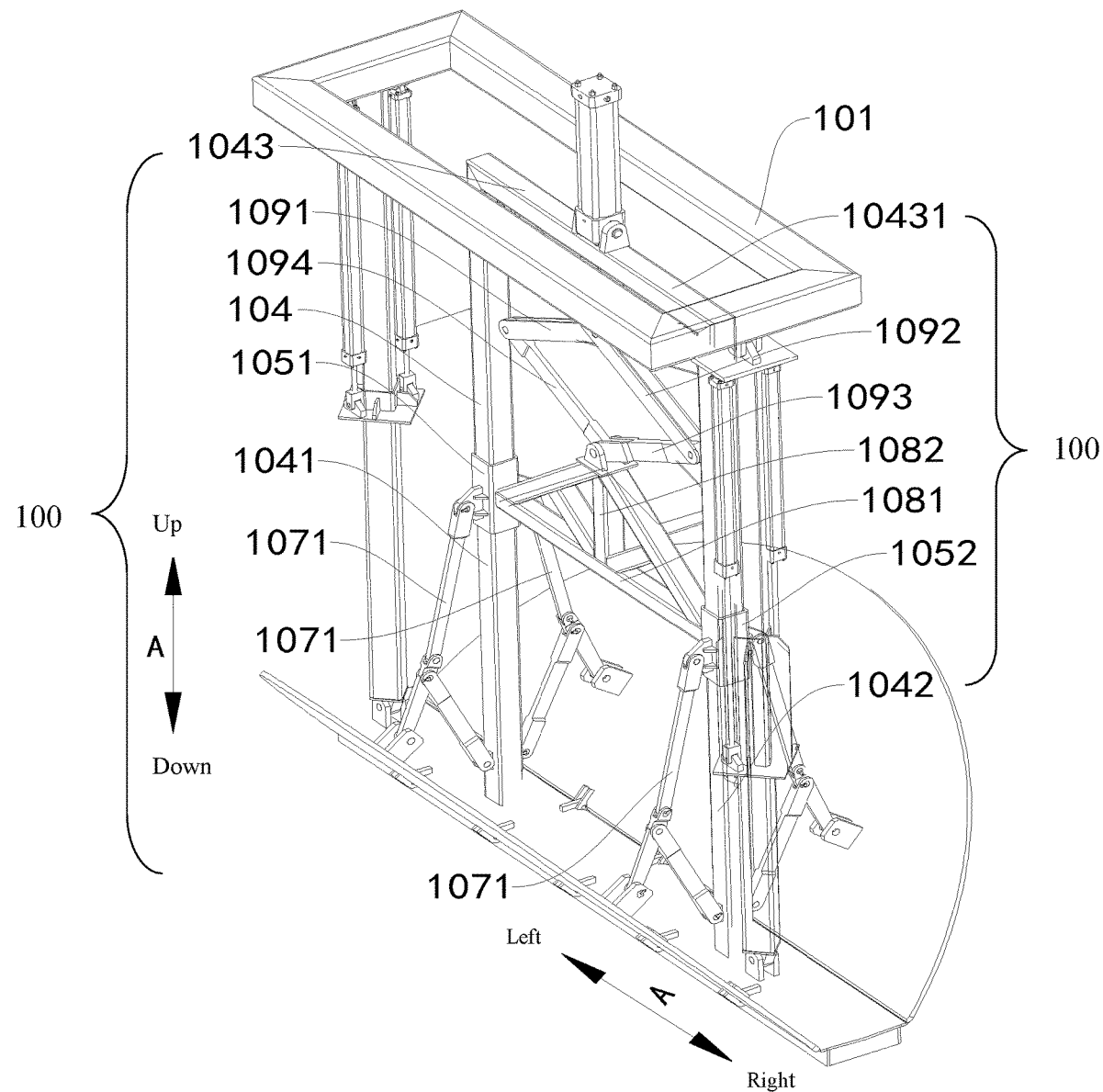
FIG. 2 is a schematic view of the float salvaging apparatus according to embodiments of the present disclosure.
Figure 3:
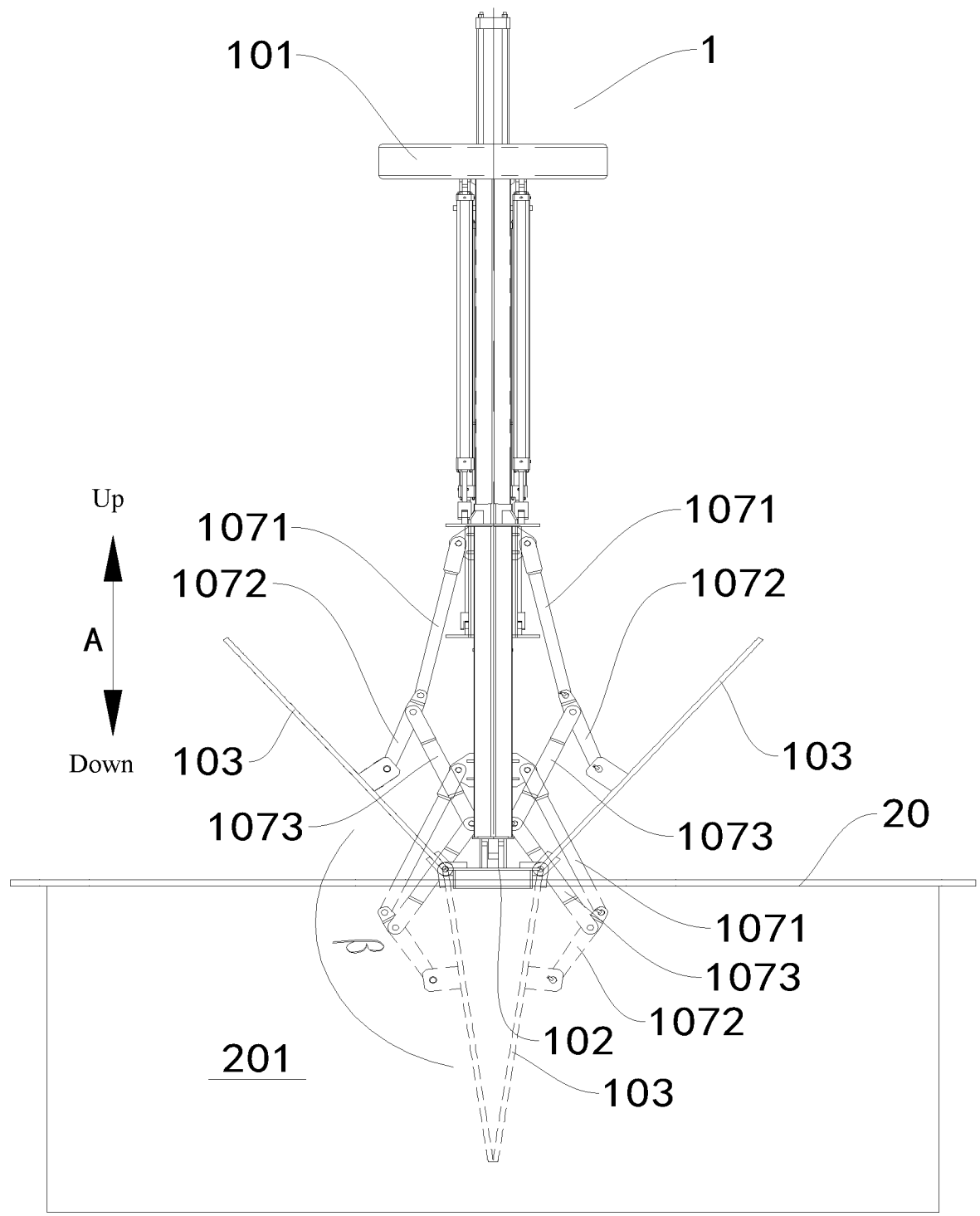
FIG. 3 is a schematic view of a melting pot according to embodiments of the present disclosure.

A melting pot 1 according to embodiments of the present disclosure is described in the following with reference to the drawings. As shown in FIG. 1 to FIG. 3, the melting pot 1 according to embodiments of the present disclosure includes a pot body 20 and a float salvaging apparatus 10. The pot body 20 is provided with a melting chamber 201 having an open upper end.

As shown in FIG. 1 to FIG. 3, the float salvaging apparatus 10 according to embodiments of the present disclosure includes a hanging bracket 101, a bearing plate 102, a rotating plate 103 and a driving assembly 100 configured to drive the rotating plate 103 to pivot.

The hanging bracket 101 is disposed above the melting chamber 201. The rotating plate 103 is pivotably disposed on the bearing plate 102, and the bearing plate 102 and the rotating plate 103 are provided on the hanging bracket 101 between an initial position and a first salvaging position and movable in the up-down direction. The driving assembly 100 is connected with the rotating plate 103 to facilitate pivoting of the rotating plate 103.

An operation process of the float salvaging apparatus 10 will be briefly described with reference to FIG. 1 to FIG. 3. When the float (the scum) in the liquid in the pot body 20 has a certain thickness, the float salvaging apparatus 10 starts to operate so as to salvage the float in the pot body 20.

The bearing plate 102 and the rotating plate 103 are made to move downwards so as to make the bearing plate 102 and the rotating plate 103 to move from the initial position to the first salvaging position. Before the rotating plate 103 enters the liquid in the pot body 20, the driving assembly 100 drives the rotating plate 103 to pivot downwards until an included angle between the rotating plate 103 and the horizontal plane is negative.

In addition, the driving assembly 100 may also be used to drive the rotating plate 103 to pivot downwards firstly until the included angle between the rotating plate 103 and the horizontal plane is negative, then the bearing plate 102 and the rotating plate 103 are made to move from the initial position to the first salvaging position.

When the bearing plate 102 and the rotating plate 103 are located at the first salvaging position, the driving assembly 100 is used to drive the rotating plate 103 to pivot upwards until the included angle between the rotating plate 103 and the horizontal plane is larger than or equal to 0 degree so that the float in the pot body 20 is located in an accommodating space defined between the bearing plate 102 and the rotating plate 103.

Finally, the rotating plate 103 and the bearing plate 102 are moved from the first salvaging position to the initial position, thus the float in the pot body 20 can be salvaged.

By means of the float salvaging apparatus 10, according to embodiments of the present disclosure, it is needless to salvage the float in the pot body 20 manually, so that an automatic operation can be realized. In addition, an operation range can be enlarged by increasing an area of the rotating plate 103, even the whole pot body 20 can be covered completely, so that the float salvaging apparatus 10 has advantages of a wide salvaging scope and a high operation efficiency.

In the float salvaging apparatus 10 according to embodiments of the present disclosure, by disposing the bearing plate 102 and the rotating plate 103 pivotably disposed to the bearing plate 102, the float in the pot body 20 can be salvaged rapidly, effectively and automatically.

Thus, the float salvaging apparatus 10 according to embodiments of the present disclosure has advantages of a high salvaging efficiency, a great salvaging effect and a high automatic degree.

In the melting pot 1 according to embodiments of the present disclosure, by disposing the float salvaging apparatus 10, the float in the pot body 20 can be salvaged rapidly, effectively and automatically.

A salvaging method according to embodiments of the present disclosure performed by means of the float salvaging apparatus 10 according to the embodiments of the present disclosure is also provided in the present disclosure. The salvaging method according to embodiments of the present disclosure includes the following steps of:

A) rotating the rotating plate 103 to make the included angle between the rotating plate 103 and the horizontal plane negative;

B) moving the bearing plate 102 and the rotating plate 103 from the initial position to the first salvaging position;

C) rotating the rotating plate 103 to make the included angle between the rotating plate 103 and the horizontal plane larger than or equal to 0 degree so as to make the float in the accommodating space defined between the bearing plate 102 and the rotating plate 103; and D) moving the bearing plate 102 and the rotating plate 103 from the first salvaging position to the initial position.

The step A) may be performed firstly and then the step B) is performed, or the step A) and the step B) are performed simultaneously.

With the salvaging method according to embodiments of the present disclosure, the float in the pot body 20 can be salvaged rapidly, effectively and automatically.

Advantageously, the pot body 20, the bearing plate 102 and the rotating plate 103 can be covered up with a cover, such that the float can be prevented from overflowing when the float salvaging apparatus 10 is used to salvage the float in the pot body 20, which is environmental friendly.

As shown in FIG. 1 to FIG. 3, the melting pot 1 according to some embodiments of the present disclosure includes the pot body 20 and the float salvaging apparatus 10. The float salvaging apparatus 10 includes the hanging bracket 101, the bearing plate 102, the rotating plate 103 and the driving assembly 100.

The bearing plate 102 and the rotating plate 103 are disposed to the hanging bracket 101 between the initial position and the first salvaging position and movable in the up-down direction. Advantageously, the bearing plate 102 and the rotating plate 103 are located above a liquid level in the melting chamber 201 (the pot body 20) at the initial position, and at least a part of the rotating plate 103 is located below the liquid level in the melting chamber 201 at the first salvaging position.

More advantageously, in order to salvage more floats, in the first salvaging position, the rotating plate 103 and the bearing plate 102 descend below the liquid level in the melting chamber 201.

The bearing plate 102 is hinged on the hanging bracket 101 i.e. the bearing plate 102 is pivotably disposed on the hanging bracket 101. The float salvaging apparatus 10 can be moved above a designated collecting area after salvaging a particle material, then the bearing plate 102 is rotated (pivoted) to an inclined state so that the float is poured out to the collecting area.

Specifically, when the bearing plate 102 is inclined at a certain angle, the float collected on the bearing plate 102 can be downloaded to a movable slag chute and the float can be conveyed to the collecting area by means of the movable slag chute.

In an embodiment of the present disclosure, the rotating plate 103 is pivotably disposed on the bearing plate 102 between an entering position (for example, as shown by a solid line in FIG. 1) and a second salvaging position (for example, as shown by a dash line in FIG. 1). An included angle of the rotating plate 103 at the second salvaging position and a horizontal plane is larger than or equal to 10 degrees and smaller than 90 degrees, and the included angle of the rotating plate 103 at the entering position and the horizontal plane ranges from −60 degrees to −120 degrees (−60 degrees and −120 degrees are included, the same below). That is, in the entering position, an included angle between the rotating plate 103 and a vertical direction ranges from −30 degrees to 30 degrees.

When the rotating plate 103 is located above the horizontal plane, the included angle between the rotating plate 103 and the horizontal plane is larger than 0 degree. When the rotating plate 103 is located below the horizontal plane, the included angle between the rotating plate 103 and the horizontal plane is negative. That is, when the rotating plate 103 is located above the horizontal plane, the included angle between the rotating plate 103 and the horizontal plane is a positive value. When the rotating plate 103 is located below the horizontal plane, the included angle between the rotating plate 103 and the horizontal plane is a negative value. When the rotating plate 103 is located at a left side of the vertical plane, the included angle between the rotating plate 103 and the vertical plane is a negative value. When the rotating plate 103 is located at a right side of the vertical plane, the included angle between the rotating plate 103 and the vertical plane is a positive value.

A plurality of the rotating plates 103 may be provided. Advantageously, as shown in FIG. 1 to FIG. 3, two rotating plates 103 are provided and the two rotating plates 103 are oppositely arranged.

As shown in FIG. 1, an inner end portion of each of the rotating plates 103 is pivotably disposed to the bearing plate 102. Advantageously, the two rotating plates 103 are rotated to make outer end portions of the two rotating plates 103 in contact with each other before the rotating plates 103 enter the liquid in the pot body 20 (as shown by the solid line in FIG. 1), so as to reduce the influence on the float in the pot body 20 when the rotating plates 103 enter the liquid in the pot body 20 to the greatest extent.

Advantageously, both the bearing plate 102 and the rotating plate 103 are flat plates, the bearing plate 102 is disposed horizontally, and when the rotating plate 103 is oriented along a horizontal direction, that is, when the included angle between the rotating plate 103 and the horizontal plane is equal to 0 degree, shape and size of a constituted flat plate formed by the bearing plate 102 and the rotating plate 103 match with shape and size of a cross section of the melting chamber 201 respectively. Thus, all of the float in the pot body 20 can be salvaged one time.

For example, the melting chamber 201 has a circular cross section. When the rotating plate 103 is oriented along the horizontal direction, the constituted flat plate formed by the bearing plate 102 and the rotating plate 103 also has a circular shape, and the cross sectional area of the melting chamber 201 is substantially equal to an area of the constituted flat plate.

In an embodiment of the present disclosure, the bearing plate 102 may include a horizontal plate 1022 and a stop plate (not shown in the figures). The stop plate is disposed on the horizontal plate 1022 and extend upwards from the horizontal plate 1022. At the second salvaging position, the accommodating space is defined between the bearing plate 102 and the rotating plate 103. That is, at the second salvaging position, the accommodating space is defined among the horizontal plate 1022, the stop plate and the rotating plate 103, thus the float in the accommodating space can be prevented from dropping.

As shown in FIG. 1, at least one of the bearing plate 102 and the rotating plate 103 is provided with a leakage hole 1021. When the float is salvaged, the bearing plate 102 and the rotating plate 103 can be stationary above the pot body 20 for a period of time so that the liquid carried by the float can flow back into the pot body 20.

In an example of the present disclosure, as shown in FIG. 1 and FIG. 2, the hanging bracket 101 may include a hanging bracket body 1011 and a guiding rod 1012. The guiding rod 1012 is disposed onto the hanging bracket body 1011, in which the guiding rod 1012 extends downwards from the hanging bracket body 1011. Advantageously, the guiding rod 1012 extends along the vertical direction.

The bearing plate 102 is provided on the guiding rod 1012 between the initial position and the first salvaging position and movable in the up-down direction, thus the bearing plate 102 and the rotating plate 103 can be made to move up and down along a predetermined track, as which the reliability and stability of the float salvaging apparatus 10 can be improved.

Specifically, the bearing plate 102 can be driven to move up and down between the initial position and the first salvaging position by means of a driving device. The up-down direction is shown by the arrow A in FIG. 1 to FIG. 3.

As shown in FIG. 1 and FIG. 2, the hanging bracket 101 may further include a sleeve rod 1013. The sleeve rod 1013 is sleeved over the guiding rod 1012 between the initial position and the first salvaging position and movable in the up-down direction, and the bearing plate 102 is disposed to the guiding rod 1012. The sleeve rod 1013 is driven to move up and down between the initial position and the first salvaging position by means of the driving device, so that the sleeve rod 1013 can drive the bearing plate 102 and the rotating plate 103 to move up and down between the initial position and the first salvaging position, as which the assembly difficulty of the bearing plate 102 and the hanging bracket 101 is reduced. Thus, the structure of the float salvaging apparatus 10 is more reasonable.

The driving assembly 100 may be an air cylinder, an oil cylinder or the like. A cylinder block of the driving assembly 100 may be mounted onto the bearing plate 102, and a piston rod of the driving assembly 100 may be connected with the rotating plate 103 so as to drive the rotating plate 103 to pivot between the entering position and the second salvaging position.

The driving assembly 100 may further include a rope, a fixed pulley and an electric motor. A first end of the rope may be connected with the rotating plate 103, and a second end of the rope may reel the fixed pulley and be connected with an electric motor shaft of the electric motor. By rotating the electric motor shaft of the electric motor, the rope can be wound or released so as to drive the rotating plate 103 to pivot between the entering position and the second salvaging position.

As shown in FIG. 2 and FIG. 3, in some examples of the present disclosure, the driving assembly 100 includes a support 104, a sliding block, a drive (not shown in the figures) and a connecting rod assembly. The support 104 is disposed onto an upper surface of the bearing plate 102, that is the bracket 104 is able to move up and down between the initial position and the first salvaging position along with the bearing plate 102. The sliding block is disposed to the support 104 and movable in the up-down direction and the drive is connected with the sliding block so as to drive the sliding block to move up and down.

The connecting rod assembly includes a first connecting rod 1071, a second connecting rod 1072 and a third connecting rod 1073. An upper end of the first connecting rod 1071 is articulated with the sliding block, a lower end of the second connecting rod 1072 is articulated with the rotating plate 103, a first end of the third connecting rod 1073 is articulated with the support 104. A lower end of the first connecting rod 1071 is articulated with an upper end of the second connecting rod 1072, a second end of the third connecting rod 1073 is articulated with the upper end of the second connecting rod 1072. Thus, the structure of the float salvaging apparatus 10 is more reasonable.

When a plurality of the rotating plates 103 are provided, a plurality of connecting rod assemblies may also be provided, and the plurality of connecting rod assemblies match with the plurality of rotating plates 103 respectively so as to drive the plurality of rotating plate 103 to pivot.

As shown in FIG. 2, in an example of the present disclosure, the support 104 includes a left sliding rod 1041 and a right sliding rod 1042. The sliding block includes a left sliding block 1051 disposed onto the left sliding rod 1041 and movable in the up-down direction and a right sliding block 1052 disposed onto the right sliding rod 1042 and movable in the up-down direction. The driving assembly 100 further includes a transverse rod 1081 connected with the drive. The transverse rod 1081 is connected with both the left sliding block 1051 and the right sliding block 1052, so that the drive drives the left sliding block 1051 and the right sliding block 1052 to move up and down by means of the transverse rod 1081.

Two connecting rod assemblies are provided. An upper end of the first connecting rod 1071 of one of the two connecting rod assemblies is articulated with the left sliding block 1051, a first end of the third connecting rod 1073 of the one of the two connecting rod assemblies is articulated with the left sliding rod 1041. An upper end of the first connecting rod 1071 of the other one of the two connecting rod assemblies is articulated with the right sliding block 1052, and a first end of the third connecting rod 1073 of the other one of the two connecting rod assemblies is articulated with the right sliding rod 1042. That is, each rotating plate 103 is connected with the two connecting rod assemblies, thus the rotating plates 103 can be driven to pivot more stably, and as a result the structure of the float salvaging apparatus 10 is more reasonable.

Advantageously, as shown in FIG. 2, the driving assembly 100 for the rotating plate further includes an upright rod 1082, the drive is connected with the upright rod 1082, and the upright rod 1082 is connected with the transverse rod 1081. In other words, the driving assembly 100 drives the left sliding block 1051 and the right sliding block 1052 to move up and down by means of the upright rod 1082 and the transverse rod 1081 sequentially. Specifically, the lower end of the upright rod 1082 is connected with a middle portion of the transverse rod 1081.

As shown in FIG. 2, in a specific example of the present disclosure, the support 104 further includes a connection rod 1043 connected with the left sliding rod 1041 and the right sliding rod 1042. The driving assembly 100 further includes a fourth connecting rod 1091, a fifth connecting rod 1092, a sixth connecting rod 1093 and a seventh connecting rod 1094.

The fourth connecting rod 1091 and the fifth connecting rod 1092 are arranged crosswise and articulated with each other, and the drive is connected to a hinge position of the fourth connecting rod 1091 and the fifth connecting rod 1092. That is, crossed parts of the fourth connecting rod 1091 and the fifth connecting rod 1092 are articulated together. An upper end of the fourth connecting rod 1091 and an upper end of the fifth connecting rod 1092 are articulated with the connection rod 1043. An upper end of the sixth connecting rod 1093 is articulated with a lower end of the fifth connecting rod 1092. An upper end of the seventh connecting rod 1094 is articulated with a lower end of the fourth connecting rod 1091, both a lower end of the sixth connecting rod 1093 and a lower end of the seventh connecting rod 1094 are articulated with the upright rod 1082. Thus, the structure of the float salvaging apparatus 10 is more reasonable.

The drive drives the left sliding block 1051 and the right sliding block 1052 to move up and down by means of the fourth connecting rod 1091, the fifth connecting rod 1092, the sixth connecting rod 1093, the seventh connecting rod 1094, the upright rod 1082 and the transverse rod 1081 sequentially.

Advantageously, the connection rod 1043 may include a rod body 10431, a first sliding block (not shown in the figures) and a second sliding block (not shown in the figures). The rod body 10431 is connected with the left sliding rod 1041 and the right sliding rod 1042, both the first sliding block and the second sliding block are disposed to the rod body 10431 and moveable in a left-right direction. The left-right direction is shown with an arrow B in FIG. 2.

An upper end of the fourth connecting rod 1091 is articulated with the first sliding block of the connection rod 1043, and an upper end of the fifth connecting rod 1092 is articulated with the second sliding block of the connection rod 1043. Thus, the structure of the float salvaging apparatus 10 is more reasonable.

Specifically, a left end of the rod body 10431 is connected with the left sliding rod 1041, a right end of the rod body 10431 is connected with the right sliding rod 1042, a left end of the transverse rod 1081 is connected with the left sliding block 1051, and a right end of the transverse rod 1081 is connected with the right sliding block 1052. When the drive drives the rotating plate 103 to pivot upwards, the upper end of the fourth connecting rod 1091 drives the first sliding block to move rightwards, and the upper end of the fifth connecting rod 1092 drives the second sliding block to move leftwards. When the drive drives the rotating plate 103 to pivot downwards, the upper end of the fourth connecting rod 1091 drives the first sliding block to move leftwards, and the upper end of the fifth connecting rod 1092 drives the second sliding block to move rightwards.

The upward pivoting of the rotating plate 103 means that an end portion of the rotating plate 103 away from the bearing plate 102 move upwards when the rotating plate 103 pivots. The downward pivoting of the rotating plate 103 means that the end portion of the rotating plate 103 away from the bearing plate 102 move downwards when the rotating plate 103 pivots.

As shown in FIG. 2, the lower end of the sixth connecting rod 1093 and the lower end of the seventh connecting rod 1094 are articulated together. In other words, the lower end of the sixth connecting rod 1093, the lower end of the seventh connecting rod 1094 and the upright rod 1082 may be articulated together. Thus, the structure of the float salvaging apparatus 10 is more reasonable.

In the specification, it should be understood that terms such as "center", "longitudinal", "lateral", "length", "width", "depth", "up", "down", "front", "rear", "left", "right", "vertical", "horizontal", "top", "bottom", "inner", "outer", "clockwise", "counterclockwise", "axial direction", "radial direction", "circumferential direction" should be construed to refer to the orientation as then described or as shown in the drawings under discussion. These relative terms are for convenience of description and do not require that the present disclosure be constructed or operated in a particular orientation, so shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" should be understood broadly, and may be, for example, fixed connections, detachable connections, or integral connections; may be mechanical connection, electric connection or be able to communicate with each other; may also be direct connections or indirect connections via intervening structures; may also be inner communications or interaction relationships of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In the present specification, the illustrative statement of the terms above is not necessarily referring to the same embodiment or example. Furthermore, the particular features, structures, materials, or characteristics may be combined in any suitable manner in one or more embodiments or examples. In addition, the different embodiments or examples as well as the features in the different embodiments or examples described in the specification can be combined or united by those skilled in the related art in the absence of contradictory circumstances.

Although embodiments of the present disclosure have been shown and described, it would be appreciated by those skilled in the art that changes, alternatives, variation and modifications can be made in the embodiments without departing from spirit and principles of the present disclosure, and the scope of the present disclosure is limited by the claims and its equivalents.

What is claimed is:

1. A salvaging method comprising:
    salvaging float by using a float salvaging apparatus, which comprises:
        a hanging bracket;
        a bearing plate;
        a rotating plate pivotably disposed on the bearing plate, the bearing plate and the rotating plate being provided on the hanging bracket and movable in an up-down direction between an initial position and a first salvaging position; and
        a driving assembly connected to the rotating plate and configured to pivot the rotating plate to a second salvaging position relative to the bearing plate, and
    wherein the bearing plate comprises a horizontal plate and a stop plate, the stop plate is disposed onto the horizontal plate and extends upwards from the horizontal plate, and an accommodating space is defined between the bearing plate and the rotating plate at the second salvaging position, and
    wherein the salvaging comprises the following steps:
    A) rotating the rotating plate to make an included angle between the rotating plate and the horizontal plane negative;
    B) moving the bearing plate and the rotating plate from the initial position to the first salvaging position;
    C) rotating the rotating plate to make the included angle between the rotating plate and the horizontal plane larger than or equal to 0 degree so as to make the float to be located in the accommodating space defined between the bearing plate and the rotating plate; and
    D) moving the bearing plate and the rotating plate from the first salvaging position to the initial position.

2. The salvaging method for the float salvaging apparatus according to claim 1, wherein two rotating plates are provided and the two rotating plates are oppositely disposed, an inner end portion of each of the rotating plates is pivotably disposed to the bearing plate, and in the step A), the two rotating plates are rotated to make outer end portions of the two rotating plates in contact with each other.

3. The salvaging method for the float salvaging apparatus according to claim 1, wherein in step C), the rotating plate is rotated to make the included angle between the rotating plate and the horizontal plane larger than or equal to 10 degrees and smaller than 90 degrees.

4. A melting pot, comprising:
    a pot body provided with a melting chamber having an open upper end; and
    a float salvaging apparatus, comprising:
    a hanging bracket disposed above the melting chamber;
    a bearing plate;
    a rotating plate pivotably disposed on the bearing plate, the bearing plate and the rotating plate being provided on the hanging bracket and movable in an up-down direction relative to the pot body between an initial position and a first salvaging position; and
    a driving assembly connected to the rotating plate and configured to pivot the rotating plate to a second salvaging position relative to the bearing plate,
    wherein the bearing plate comprises a horizontal plate and a stop plate, the stop plate is disposed onto the horizontal plate and extends upwards from the horizontal plate, and an accommodating space is defined between the bearing plate and the rotating plate at the second salvaging position to thereby salvage float in the melting chamber.

5. The melting pot according to claim 4, wherein the bearing plate and the rotating plate are located above a liquid level in the melting chamber at the initial position, and at least a part of the rotating plate is located below the liquid level in the melting chamber at the first salvaging position.

6. The melting pot according to claim 4, wherein the rotating plate is pivotably disposed on the bearing plate between an entering position and the second salvaging position, and wherein at the second salvaging position, an included angle between the rotating plate and a horizontal plane is larger than or equal to 10 degrees and smaller than 90 degrees, and at the entering position, the included angle between the rotating plate and the horizontal plane ranges from −60 degrees to −120 degrees.

7. The melting pot according to claim 4, wherein both the bearing plate and the rotating plate are flat plates, the bearing plate is disposed horizontally, and when the rotating plate is oriented along a horizontal direction, shape and size of a constituted flat plate formed by the bearing plate and the rotating plate match with shape and size of a cross section of the melting chamber respectively.

8. A float salvaging apparatus, comprising:
 a hanging bracket;
 a hearing plate;
 a rotating plate pivotably disposed on the bearing plate, the bearing plate and the rotating plate being provided on the hanging bracket and movable in an up-down direction between an initial position and a first salvaging position; and
 a driving assembly connected to the bearing plate and configured to pivot the rotating plate to a second salvaging position relative to the bearing plate,
 wherein the bearing plate comprises a horizontal plate and a stop plate, the stop plate is disposed onto the horizontal plate and extends upwards from the horizontal plate, and an accommodating space is defined between the bearing plate and the rotating plate at the second salvaging position to thereby salvage float in accommodating space.

9. The float salvaging apparatus according to claim 8, wherein the rotating plate is pivotably disposed on the bearing plate between an entering position and the second salvaging position, and wherein at the second salvaging position, an included angle between the rotating plate and a horizontal plane is larger than or equal to 10 degrees and smaller than 90 degrees, and at the entering position, the included angle between the rotating plate and the horizontal plane ranges from −60 degrees to −120 degrees.

10. The float salvaging apparatus according to claim 8, wherein the hanging bracket comprises:
 a hanging bracket body;
 a guiding rod disposed onto the hanging bracket body, wherein the guiding rod extends downwards from the hanging bracket body, and the bearing plate is provided on the guiding rod between the initial position and the first salvaging position and movable in the up-down direction; and
 a sleeve rod, the sleeve rod is sleeved over the guiding rod between the initial position and the first salvaging position and movable in the up-down direction, and the bearing plate is disposed to the sleeve rod.

11. The float salvaging apparatus according to claim 8, wherein the bearing plate is pivotably disposed to the hanging bracket.

12. The float salvaging apparatus according to claim 8, wherein a plurality of rotating plates are provided.

13. The float salvaging apparatus according to claim 8, wherein the driving assembly comprises:
 a support disposed onto an upper surface of the bearing plate;
 a sliding block disposed to the bracket and movable in the up-down direction;
 a drive connected with the sliding block so as to drive the sliding block to move up and down; and
 a connecting rod assembly comprising a first connecting rod, a second connecting rod and a third connecting rod, wherein an upper end of the first connecting rod is articulated with the sliding block, a lower end of the second connecting rod is articulated with the rotating plate, a first end of the third connecting rod is articulated with the support, and a lower end of the first connecting rod is articulated with an upper end of the second connecting rod and a second end of the third connecting rod is articulated with the upper end of the second connecting rod.

14. The float salvaging apparatus according to claim 13, wherein the support comprises a left sliding rod and a right sliding rod, the sliding block comprises a left sliding block disposed onto the left sliding rod and movable in the up-down direction and a right sliding block disposed onto the right sliding rod and movable in the up-down direction, the driving assembly further comprises a transverse rod connected with the drive, the transverse rod is connected with both the left sliding block and the right sliding block, two connecting rod assemblies are provided, an upper end of the first connecting rod of one of the two connecting rod assemblies is articulated with the left sliding block, a first end of the third connecting rod of the one of the two connecting rod assemblies is articulated with the left sliding rod, an upper end of the first connecting rod of the other one of the two connecting rod assemblies is articulated with the right sliding block, and a first end of the third connecting rod of the other one of the two connecting rod assemblies is articulated with the right sliding rod.

15. The float salvaging apparatus according to claim 14, wherein the driving assembly further comprises an upright rod, the drive is connected with the upright rod, and the upright rod is connected with the transverse rod.

16. The float salvaging apparatus according to claim 15, wherein the bracket further comprises a connection rod, the connection rod comprises a rod body, a first sliding block and a second sliding block, the rod body is connected with the left sliding rod and the right sliding rod, both the first sliding block and the second sliding block are disposed onto the rod body and moveable in a left-right direction, and the driving assembly further comprises:
 a fourth connecting rod and a fifth connecting rod, the fourth connecting rod and the fifth connecting rod being arranged crosswise and articulated together, an upper end of the fourth connecting rod being articulated with the first sliding block of the connection rod, an upper end of the fifth connecting rod being articulated with the second sliding block of the connection rod, wherein the drive is connected with a hinge position of the fourth connecting rod and the fifth connecting rod; and
 a sixth connecting rod and a seventh connecting rod, an upper end of the sixth connecting rod being articulated with a lower end of the fifth connecting rod, an upper end of the seventh connecting rod being articulated with a lower end of the fourth connecting rod, wherein both a lower end of the sixth connecting rod and a lower end of the seventh connecting rod are articulated with the upright rod.

17. The float salvaging apparatus according to claim 16, wherein the lower end of the sixth connecting rod is articulated with the lower end of the seventh connecting rod.

18. The float salvaging apparatus according to claim 8, wherein both of the bearing plate and the rotating plate are flat plates and the bearing plate is disposed horizontally.

19. The float salvaging apparatus according to claim 8, wherein at least one of the bearing plate and the rotating plate is provided with a hole.

20. The float salvaging apparatus according to claim 12, wherein two rotating plates are provided and the two rotating plates are oppositely disposed.

\* \* \* \* \*